H. A. RENNICK.
SAFETY WATER GAGE FOR STEAM BOILERS.
APPLICATION FILED FEB. 12, 1920.

1,377,436.

Patented May 10, 1921.

Inventor
Henry August Rennick

H. A. RENNICK.
SAFETY WATER GAGE FOR STEAM BOILERS.
APPLICATION FILED FEB. 12, 1920.
1,377,436.
Patented May 10, 1921.
2 SHEETS—SHEET 2.
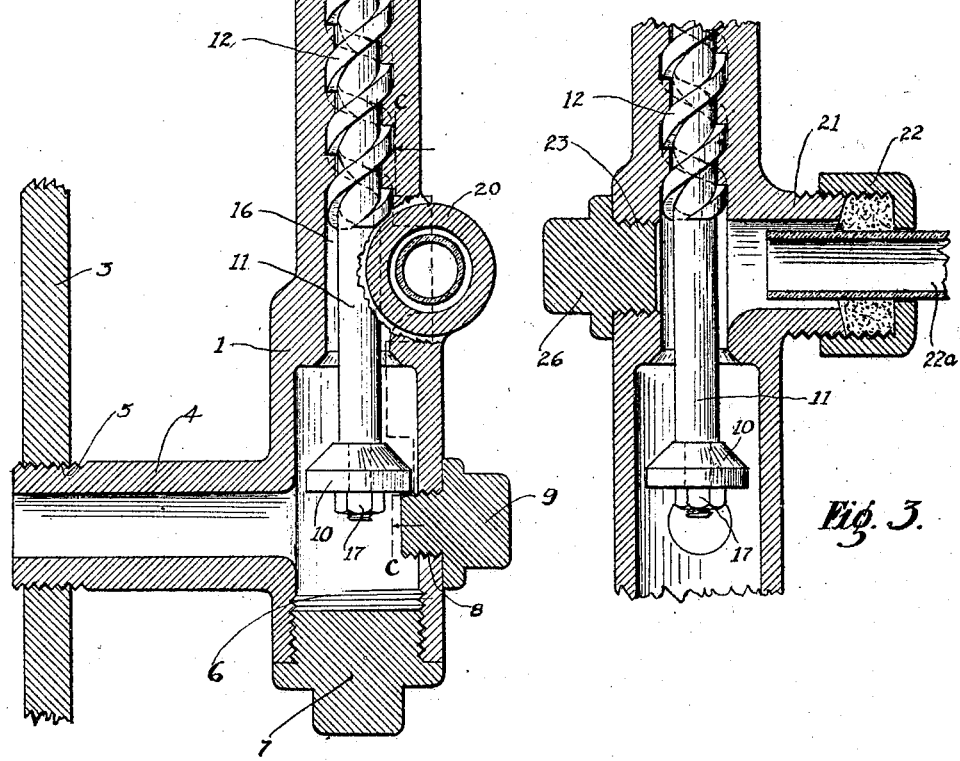

UNITED STATES PATENT OFFICE.

HENRY AUGUST RENNICK, OF OTTAWA, ONTARIO, CANADA.

SAFETY WATER-GAGE FOR STEAM-BOILERS.

1,377,436. Specification of Letters Patent. Patented May 10, 1921.

Application filed February 12, 1920. Serial No. 358,223.

*To all whom it may concern:*

Be it known that I, HENRY AUGUST RENNICK, a citizen of Canada, residing at Ottawa, in the county of Carleton and Province of Ontario, Canada, have invented certain new and useful Improvements in Safety Water-Gages for Steam-Boilers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a safety water gage for steam boilers and especially to glass gage mountings wherein a valve is closed automatically on the breaking of the glass.

The object of the invention is to construct a valve which aside from being automatic in its closing action, may be actuated by hand.

In the drawings, wherein similar numerals of reference refer to similar parts throughout the different views:

Fig. 2 is a section of the mounting on line $a, a,$ of Fig. 1.

Fig. 3 is a section on line $c, c,$ of Fig. 2.

Fig. 4 is a cross section of the bushing for connecting a try-cock.

Figure 1:
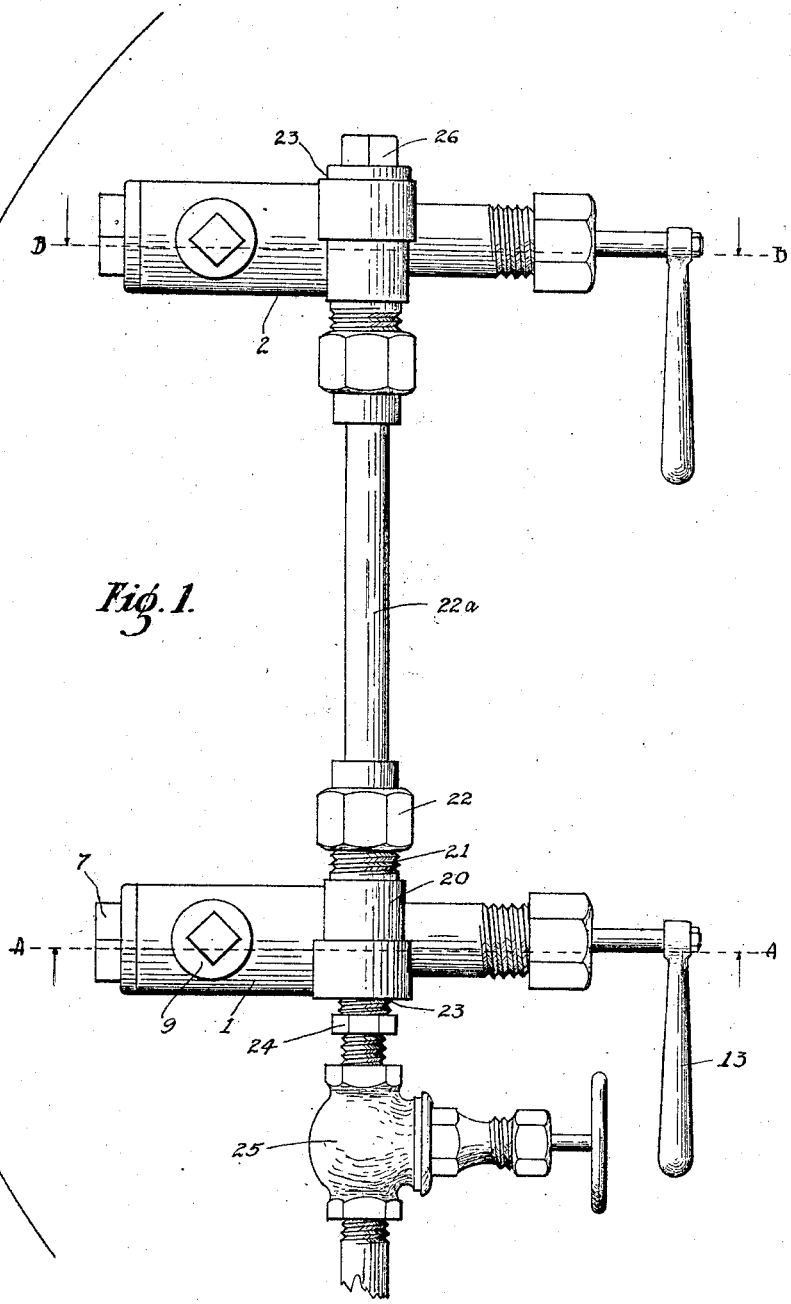
Figure 1 is a view of the gage as applied to a boiler.

Referring to Fig. 1, 1 is the shell of the lower glass mounting and 2 is the shell of the upper glass mounting. As both mountings are of similar construction and as they are interchangeable, one only will be described.

Referring to Fig. 2, 3 is a fragment of a boiler plate, 4 is an extension of the glass mounting having screw threads 5 screwed in the threaded opening in the boiler plate. The extension 4 is integral with the shell 1 of the mounting, said shell has an opening 6 closed by a plug 7, another opening 8 closed by a plug 9. The opening 6 is intended to permit the machining of the valve seat, to grind said valve on said seat and also to insert the valve in place.

The opening 8 serves to clean the steam passage in the extension 4.

The valve 10 is provided with a stem 11 which carries spiral threads 12 and a handle 13 secured in place by nut 14 as shown. The shell 1 is formed with a longitudinally threaded bore 16 to receive the threads 12 of the stem 11. Valve 10 is shown as fastened on the stem 11 by nut 17. The outer end of the valve stem is made steam-tight by packing 18 held in place by cap 19.

20 is an extension in the shell having a threaded end 21 upon which is screwed a cap 22 forming a stuffing box for glass tube $22^a$. The extension 20 has a threaded perforation at the end opposite the stuffing box intended to receive a bushing 24 to which may be connected a blow off valve 25, or this opening may be closed by a plug 26. The upper aperture 23 of the upper mounting may serve to insert the gage glass in position.

The mode of operation is as follows:

When the glass is fractured the onrush of the steam toward the break, presses the valve toward its seat and owing to the screw thread in its stem, this stem will revolve until the valve is seated. It will be clear that a reverse movement can be given to the valve by actuating the stem by hand with handle 13. It will therefore be clear that as soon as the broken glass has been replaced a turn of the stem by handle 13 will unseat the valve and place the gage in working condition.

I claim:

1. A gage glass mounting having a valve chamber provided with steam inlet and outlet extensions, a coarse pitch female thread formed in the bore of said outlet extension, a valve mounted in said chamber to close the steam outlet by the rush of steam upon the breakage of the glass, said valve having a threaded stem engaging the threads in the outlet extension, the pitch of the threads being sufficiently coarse to permit the pressure of steam to screw the valve stem and thereby close the valve upon its seat.

2. A gage glass mounting having a valve chamber communicating with the steam under pressure, a valve seat at one end of said chamber, an extension of said chamber contiguous with said valve seat and formed with a longitudinal bore carrying a coarse pitch female thread, a valve stem provided with a thread to engage the thread in the said extension, the pitch of the threads being sufficiently coarse to permit the pressure of steam to screw the valve stem and thereby close the valve upon its seat upon the breakage of the glass, a valve rigidly connected to said stem, said valve closing automatically by the rush of steam upon breakage of the glass.

In testimony whereof I affix my signature in presence of two witnesses.

HENRY AUGUST RENNICK.

Witnesses:
W. E. NOFFKO,
H. H. DOUGLAS.